US008029942B2

(12) United States Patent
Gurau et al.

(10) Patent No.: US 8,029,942 B2
(45) Date of Patent: Oct. 4, 2011

(54) FUEL CELL SYSTEM WITH FLOW FIELD CAPABLE OF REMOVING LIQUID WATER FROM THE HIGH-PRESSURE CHANNELS

(75) Inventors: Vladimir Gurau, Shaker Hts., OH (US); Christine Zawodzinski, Shaker Hts., OH (US); Tom Zawodzinski, Shaker Hts., OH (US); Jesse Wainright, Willoughby Hills, OH (US)

(73) Assignee: Case Western Reserve University, Cleveland, OH (US)

( * ) Notice: Subject to any disclaimer, the term of this patent is extended or adjusted under 35 U.S.C. 154(b) by 1305 days.

(21) Appl. No.: 11/051,936

(22) Filed: Feb. 4, 2005

(65) Prior Publication Data
US 2005/0191541 A1 Sep. 1, 2005

Related U.S. Application Data

(60) Provisional application No. 60/541,602, filed on Feb. 4, 2004.

(51) Int. Cl.
*H01M 8/00* (2006.01)
*H01M 8/04* (2006.01)
(52) U.S. Cl. .................. 429/514; 429/512; 429/513
(58) Field of Classification Search .......... 429/12–46, 429/512–519
See application file for complete search history.

(56) References Cited

U.S. PATENT DOCUMENTS

| | | | |
|---|---|---|---|
| 4,988,583 A | 1/1991 | Watkins et al. | |
| 5,108,849 A | 4/1992 | Watkins et al. | |
| 5,200,278 A * | 4/1993 | Watkins et al. | 429/24 |
| 5,300,370 A | 4/1994 | Washington et al. | |
| 5,641,586 A | 6/1997 | Wilson | |
| 5,686,199 A | 11/1997 | Cavalca et al. | |
| 5,773,160 A | 6/1998 | Wilkinson et al. | |
| 6,344,290 B1 * | 2/2002 | Bossel | 429/38 |
| 6,541,145 B2 | 4/2003 | Wilkinson et al. | |
| 6,551,736 B1 | 4/2003 | Gurau et al. | |
| 6,586,128 B1 | 7/2003 | Johnson et al. | |
| 2003/0077501 A1 | 4/2003 | Knights et al. | |
| 2003/0129468 A1 * | 7/2003 | Issacci et al. | 429/34 |

OTHER PUBLICATIONS

Vladimir Gurau, Hongtan Liu, and Sadik Kakac, Dept. of Mechanical Engineering, University of Miami, Coral Gables, FL 33124; Nov. 1988 vol. 44, No. 11; pp. 2410 to 2422; AIChE Journal.

* cited by examiner

*Primary Examiner* — Barbara Gilliam
*Assistant Examiner* — Steven Scully
(74) *Attorney, Agent, or Firm* — Tarolli, Sundheim, Covell & Tummino LLP

(57) ABSTRACT

A fuel cell system having flow fields capable to operate like interdigitated flow fields, but in the same time allowing the removal of liquid water collected in the high-pressure channels, throughout individual exhaust passages. In a preferred embodiment, the channels follow radial-circumferential trajectories, each channel being provided with individual exhaust passages. In another preferred embodiment, each channel is provided with a valve control in both individual supply passages and individual exhaust passages allowing the system to operate alternatively as an interdigitated flow field as well as an open-channel flow field.

15 Claims, 5 Drawing Sheets

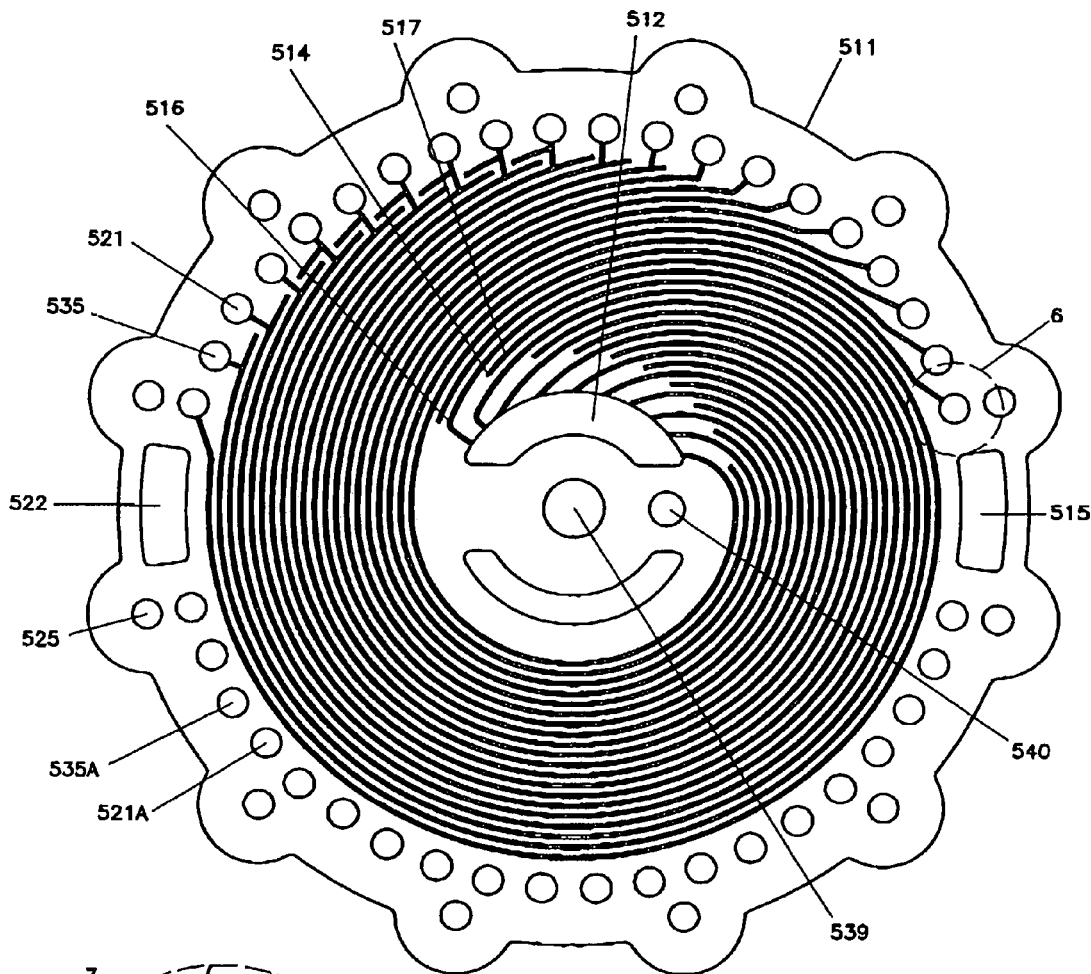
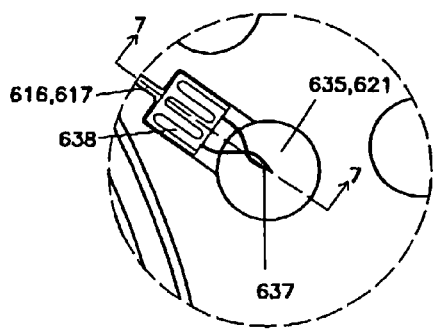
FIG. 5
FIG. 6
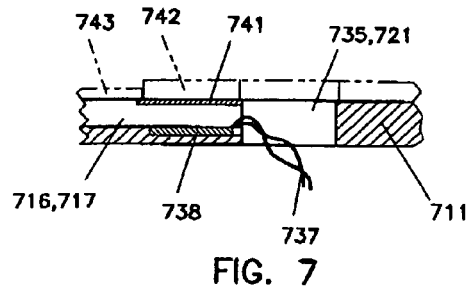
FIG. 7

FUEL CELL SYSTEM WITH FLOW FIELD CAPABLE OF REMOVING LIQUID WATER FROM THE HIGH-PRESSURE CHANNELS

CROSS-REFERENCE TO RELATED APPLICATIONS

This application claims the benefit of U.S. Provisional Patent Application No. 60/541,602 filed on Feb. 4, 2004, which is incorporated herein by reference.

BACKGROUND OF THE INVENTION

Fuel cells are electrochemical devices that convert directly the chemical energy of the reactant and oxidant into low voltage direct current electricity. The proton exchange membrane fuel cell (PEMFC) is the most promising of all fuel cell systems, its features making it an attractive candidate for stationary and automotive applications. The basic single cell PEMFC consists of an anode and a cathode bipolar plate, each provided with a network of channels, hereafter flow-field, formed in the electrically conductive material mass. The flow field is usually formed in the central portion of the bipolar plate, while the peripheral portion of the bipolar plate that surrounds the flow field is generally used to support sealing gaskets. The planar sides of the bipolar plates containing the flow fields are in contact with the gas diffusers, which generally consist of a porous electrically conductive material that may be carbon fiber paper or carbon fiber cloth, most of the times impregnated with mixtures of black carbon and PTFE. The gas diffusers delimit the forth side of the channels where the gaseous reactants flow. The solid matrix of the gas diffusers provides path for the electrons to be transported between the bipolar plates and the catalyst coated membrane (CCM). The CCM generally consists of a solid, ion conducting, polymer membrane impermeable to gases and two catalyst layers bounded on each side of the membrane. The catalyst layers are mixtures of electrically conductive carbon grains, platinum supported on carbon as catalyst, ionomer soaked with water as solid electrolyte and possibly PTFE as binder and hydrophobizing agent.

The sandwich defined by these elements is enclosed between two distribution-compression plates that provide inlet and outlet manifolds for the reactants and coolant, as well as an adequate compression level for the stack. The compression level of the stack is adjusted by threaded tie rod-nut assemblies, generally placed along the peripheral part of the fuel cell stack. An adequate stack compression level is required in order to insure a low interface resistance between the fuel cell components, as well as an optimum sealing compression for the gaskets.

In a PEM fuel cell, hydrogen rich fuel is fed through the anode flow-field, while atmospheric air, or substantially pure oxygen is fed through the cathode flow-field. The gaseous reactants are transported by convection and diffusion throughout the channels and, depending on the technical solution of the flow fields—solely by diffusion (continuous-channel flow fields) or both by convection and diffusion (discontinuous, or interdigitated flow fields) throughout the gas diffusers, towards the CCM. The hydrogen molecules break into protons and electrons in the anode catalyst layer. Electricity is generated when the electrons pass through an outer electrical circuit and the positive ions pass through the solid polymer membrane towards the cathode catalyst layer and react with the oxygen to produce water.

In order to improve the ion transport across the CCM, the gaseous reactants are generally humidified upstream of the fuel cell inlet manifolds.

The planar area defined by the intersection of the projections of both flow fields, gas diffusers and catalyst layers areas on the membrane, is generally known as the active area of the fuel cell. This area is electrochemically active. The effective active area of a fuel cell may actually be smaller during fuel cell operation if the gas flow channels become partially filled with liquid water.

Prior art flow-fields generally consist of a plurality of parallel, continuous channels extending from a supply passage at one end, to an exhaust passage at the other end (continuous-channel flow fields). The continuous channels may follow a serpentine trajectory (see e.g. U.S. Pat. Nos. 4,988,583 and 5,108,849) or other trajectories (see e.g. U.S. Pat. Nos. 5,686,199; 5,773,160; 6,586,128B1; 2003/0077501; U.S. Pat. No. 6,541,145B2). A common characteristic of all the continuous-channel flow fields is that the reactants are transported only by diffusion in the gas diffuser, excepting the thin boundary layer at the interface between the channels and the gas diffuser, where convection is still present (Gurau et al.: "*Two-Dimensional Model for Proton Exchange Membrane Fuel Cells*" AIChE, Vol. 44, No. 11, pp 2410-2422, 1998). As a consequence, liquid water may be removed from the gas diffusers only due to capillary forces, which cannot be controlled during the fuel cell operation; this results in a low effective porosity of the gas diffuser, which affects negatively the reactant diffusive transport. Another common characteristic of the continuous-channel flow fields is the decrease of the reactant concentration along the channels from the supply passage to the exhaust passage, which determines a non-uniform reaction rate over the active area, and therefore a non-uniform utilization of the fuel cell.

An alternative to the continuous-channel flow fields are the discontinuous, or interdigitated flow fields (U.S. Pat. Nos. 5,300,370; 5,641,586; 6,551,736B1) consisting of a plurality of parallel high-pressure channels extending from a supply passage to a dead or closed end, alternating between parallel low-pressure channels extended from a dead or closed end to an exhaust passage. The major characteristic of the discontinuous, or interdigitated flow fields is that the gaseous reactants are transported from the high-pressure channels to the low-pressure channels throughout the gas diffusers, mainly by convection. This results in a two-phase drag of the liquid water out of the gas diffuser and in a better transport of the reactant-reach gaseous mixtures towards the catalyst layer, both having a direct positive influence on the fuel cell performance. The interdigitated flow fields are also characterized by a more uniform current density, due to an even distribution of the reactants along the catalyst layer.

U.S. Pat. No. 6,551,736,B1 discloses an interdigitated flow field consisting of only two channels in a spiral configuration, with the low-pressure channel placed at a lower radius than the high-pressure channel. In this configuration, the shorter low-pressure channel will be adjacent both sides to the same, longer high-pressure channel this resulting in an improved liquid water removal from the flow field.

The advantages of the interdigitated flow fields over the continuous-channel flow fields are hindered by the impossibility to remove the liquid water accumulated in time at the high-pressure channel dead or closed ends during accidental over-humidification of the reactants, or as a consequence of vapor condensation in the flow field during non-operating time periods.

The pressure differential Δp necessary to displace a fluid of dynamic viscosity μ with velocity u along a distance d through a porous gas diffuser material of porosity ε and a permeability to that fluid k is:

$$\Delta p = \frac{d}{\varepsilon} \frac{\mu}{k} u$$

Since the value of the ratio $$\frac{\mu}{k}$$

for liquid water is many orders of magnitude higher than that for gasses, the pressure differential necessary to force the liquid water accumulated in the high-pressure channels through the gas diffuser would be many orders of magnitude higher than the pressure differentials affordable during fuel cell operations. The liquid water accumulated in time in the high-pressure channels determines a decrease of the fuel cell effective active area.

The advantages of the interdigitated flow fields over the open-channel flow fields are not noticeable at low current densities, when the performance of the fuel cell is dictated by polarization limitations instead of mass transfer limitations. Since the interdigitated flow fields require higher pressures at the fuel cell inlet then the open-channel flow fields, the use of interdigitated flow fields for fuel cells operating at low current densities is not justified. Of great interest would be a flow field able to operate as an open-channel flow field at low current densities and as an interdigitated flow field at higher current densities.

ASPECTS AND SUMMARY OF THE INVENTION

It is an aspect of the invention to provide a fuel cell bipolar plate with a novel flow field configuration, the flow field being able to distribute the gaseous reactants mainly by convection throughout the gas diffusers and thus keeping the advantages of an interdigitated flow field, while in the same time allowing the removal of the liquid water from the high-pressure channels.

It is another aspect of the invention to provide a method for eliminating the liquid water trapped in the high-pressure channels of the interdigitated flow fields by replacing the dead or closed ends of the high-pressure channels with individual exhaust passages, and by controlling with valves the purge of the liquid water from the high-pressure channels, throughout the individual exhaust passages.

It is yet another aspect of the invention to provide a method for monitoring the physical parameters in each individual channel in the flow field, and thus enabling data acquisition regarding the channel-to-channel competitions, by providing sufficiently large individual exhaust passages for each channel in the flow field, and routing electrical wires from indicators and controls situated at the exterior of the fuel cell stack, throughout said individual exhaust passages to sensors placed in the outlet ports of the individual channels.

It is further another aspect of the invention to provide a fuel cell bipolar plate with a novel flow field configuration, the flow field being able to operate alternatively as an open-channel flow field as well as an interdigitated flow field, and thus having the advantages of the open-channel flow fields operating at low current densities and the advantages of the interdigitated flow fields operating at higher current densities.

It is still another aspect of the invention to provide a method for operating a flow field alternatively as an open-channel flow field as well as an interdigitated flow field, by providing individual supply passages and individual exhaust passages for each channel in the flow field, and by controlling the open/close state of valves situated upstream of the individual supply passages and downstream of the individual exhaust passages, respectively.

According to the present invention, a fuel cell system comprises one or more fuel cells. Each fuel cell comprises: a pair of collector plates, the collector plates containing flow fields including a plurality of channels effective for the flow of reactants; a first and a second gas diffuser layer disposed between the collector plates; and a membrane electrode assembly including a membrane sandwiched between two electrode layers, the membrane electrode assembly being interposed between the gas diffuser layers; wherein at least some of the channels in the flow field are connected to individual exhaust passages.

According to the present invention, the flow field comprises alternatively arranged high pressure channels and low pressure channels, the high pressure channels extend from a common supply passage to individual exhaust passages; and the low pressure channels extending from dead ends to a common exhaust passage.

According to the present invention, the flow field comprises alternatively arranged high pressure channels and low pressure channels; the high pressure channels extend from a common supply passage to individual exhaust passages; and the low pressure channels extending from dead ends to individual exhaust passages.

According to the present invention, the high-pressure channels follow radial-circumferential trajectories; the low pressure channels follow radial-circumferential trajectories; the common supply passage of the high pressure channels are situated at a lower radius than the individual exhaust passages of the high pressure channels; and the dead ends of the low pressure channels are situated at a lower radius than the individual exhaust passages of the low pressure channels.

According to the present invention, the channels extend from individual supply passages to individual exhaust passages.

According to the present invention, a method for eliminating the liquid water trapped in the high pressure channels of fuel cell interdigitated flow fields, comprises the steps of: providing individual exhaust passages for the high pressure channels; providing opening means for controllably connect the exhaust passages to the exterior of the fuel cell; and connecting the exhaust passages to the exterior of the fuel cell whenever liquid water is formed in the high pressure channels.

According to the present invention, a method for monitoring the physical parameters in each or any individual channel in a fuel cell flow field, comprising the steps of: providing sufficiently large individual exhaust passages for the channels in order to accommodate sensors; and routing electrical wires from indicators and controls situated at the exterior of the fuel cell through the individual exhaust passages to the sensors placed in the outlet ports of the channels.

According to the present invention, a method for operating a fuel cell flow field alternatively as an open channel flow field as well as an interdigitated flow field, comprising the steps of: providing individual supply passages and individual exhaust passages for each channel in the flow field; providing opening means for controllably connect the supply passages to the fuel cell inlets and the exhaust passages to the fuel cell outlets, respectively; for operating the flow field as an interdigitated flow field, opening the means upstream the supply passages and closing the means downstream the exhaust passages of the high pressure channels and closing the means upstream the supply passages and opening the means downstream the exhaust passages of the low pressure channels; and for operating the flow field as an open channel flow field, opening the means upstream the supply passages and downstream the exhaust passages.

A more detailed explanation of the invention is provided in the following description and claims and is illustrated in the accompanying drawings.

BRIEF DESCRIPTION OF THE DRAWINGS

Reference will be made in detail to preferred embodiments of the invention, examples of which are illustrated in the accompanying drawings. The drawings are intended to be illustrative, not limiting. Although the invention will be described in the context of these preferred embodiments, it should be understood that it is not intended to limit the spirit and scope of the invention to these particular embodiments.

Certain elements in selected ones of the drawings may be illustrated not-to-scale, for illustrative clarity.

Often, similar elements throughout the drawings may be referred to by similar references numerals. For example, the element 199 in a figure (or embodiment) may be similar in many respects to the element 299 in an other figure (or embodiment). Such a relationship, if any, between similar elements in different figures or embodiments will become apparent throughout the specification, including, if applicable, in the claims and abstract.

In some cases, similar elements may be referred to with similar numbers in a single drawing. For example, a plurality of elements 199 may be referred to as 199a, 199b, 199c, etc.

The cross-sectional views, if any, presented herein may be in the form of "slices", or "near-sighted" cross-sectional views, omitting certain background lines which would otherwise be visible in a true cross-sectional view, for illustrative clarity.

Figure 1:
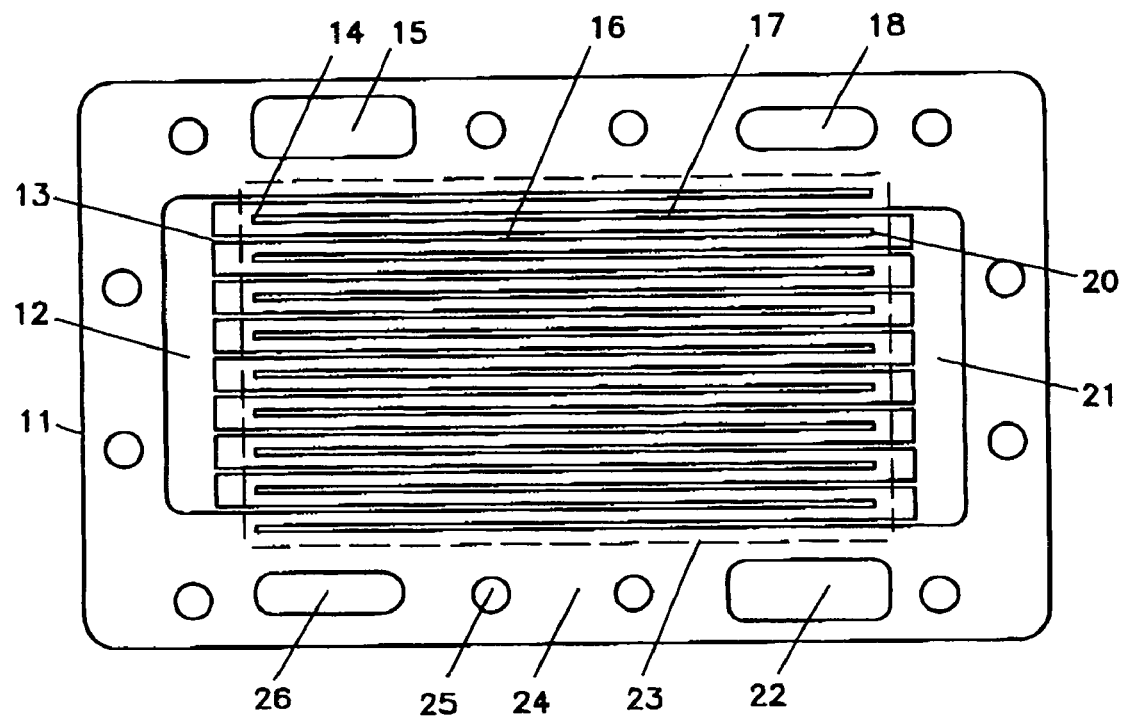

The structure, operation, and advantages of the present preferred embodiment of the invention will become further apparent upon consideration of the following description taken in conjunction with the accompanying drawings, wherein:

FIG. 1 is a plan view of a typical bipolar plate with interdigitated flow field according to the prior art, illustrating in dashed lines the theoretical active area of the cell.

Figure 2:
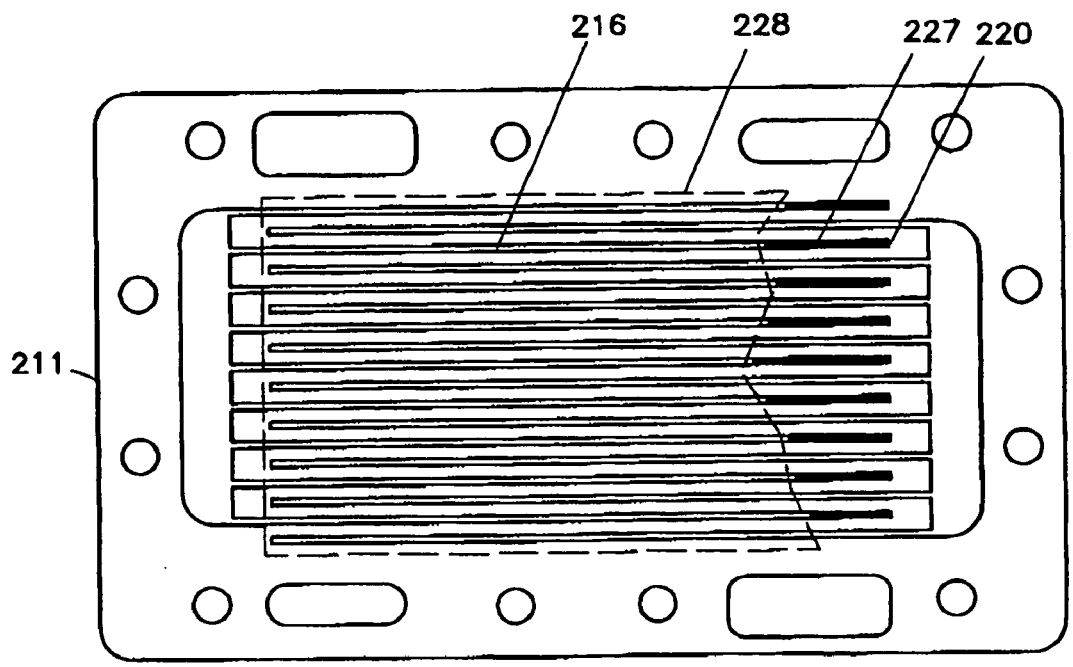

FIG. 2 is a plan view of a typical bipolar plate with interdigitated flow field according to the prior art, illustrating liquid water trapped in the high-pressure channels, and the reduced effective active area of the cell.

Figure 3:
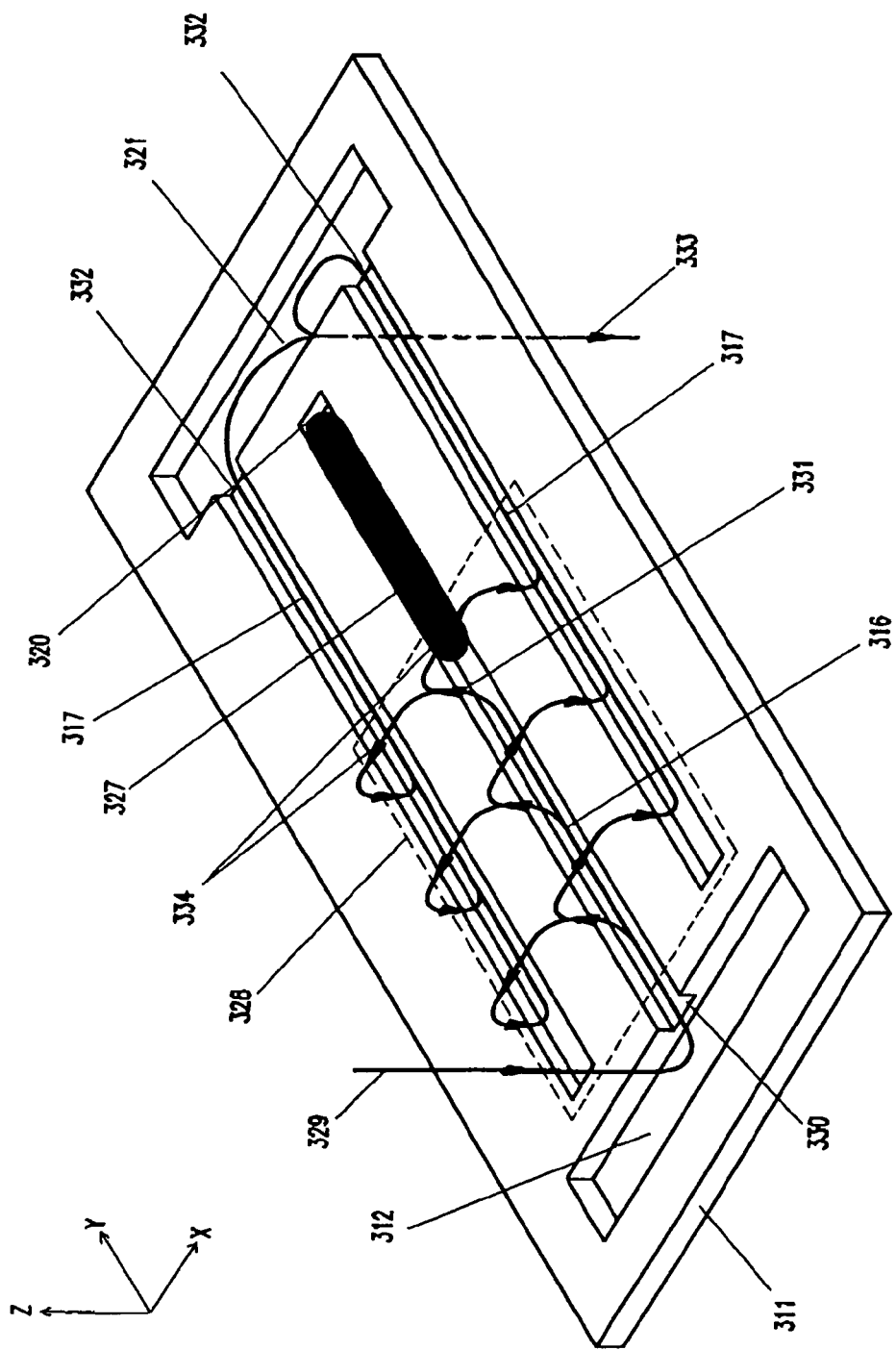

FIG. 3 is an isometric view of a schematic interdigitated flow field according to the prior art (only one high-pressure channel and two adjacent low-pressure channels are represented for clarity), illustrating the flow path of the gaseous reactant throughout the flow field and the reduced effective active area of the cell caused by liquid water trapped in the high-pressure channel.

Figure 4:
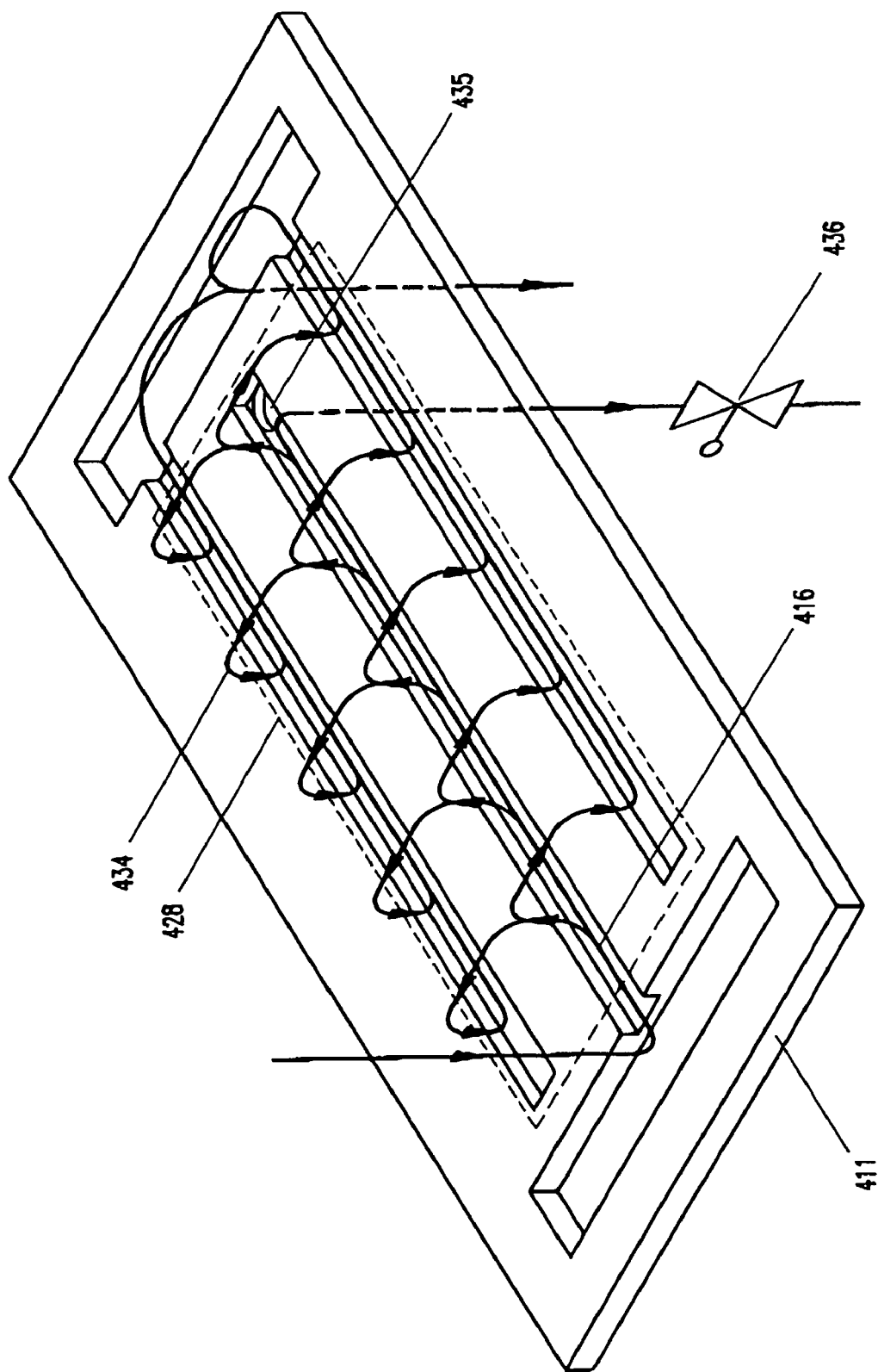

FIG. 4 is an isometric view of a schematic flow field according to the present invention (only one high-pressure channel and two adjacent low-pressure channels are represented for clarity), illustrating an individual exhaust passage for the high-pressure channel and the trajectory of the gaseous reactant throughout the flow field.

FIG. 5 is a plan view of a bipolar plate with a flow field arrangement according to a preferred embodiment of the present invention, illustrating individual exhaust passages of larger cross-sectional area for each channel.

FIG. 6 is an enlarged detail of an individual exhaust passage according to the present invention, showing the location of a sensor in the vicinity of the outlet port of the corresponding channel.

FIG. 7 is an enlarged cross-sectional view through an individual exhaust passage and the corresponding channel, illustrating the location of the sensor and the route of the wires passing through the exhaust channel.

Figure 8:
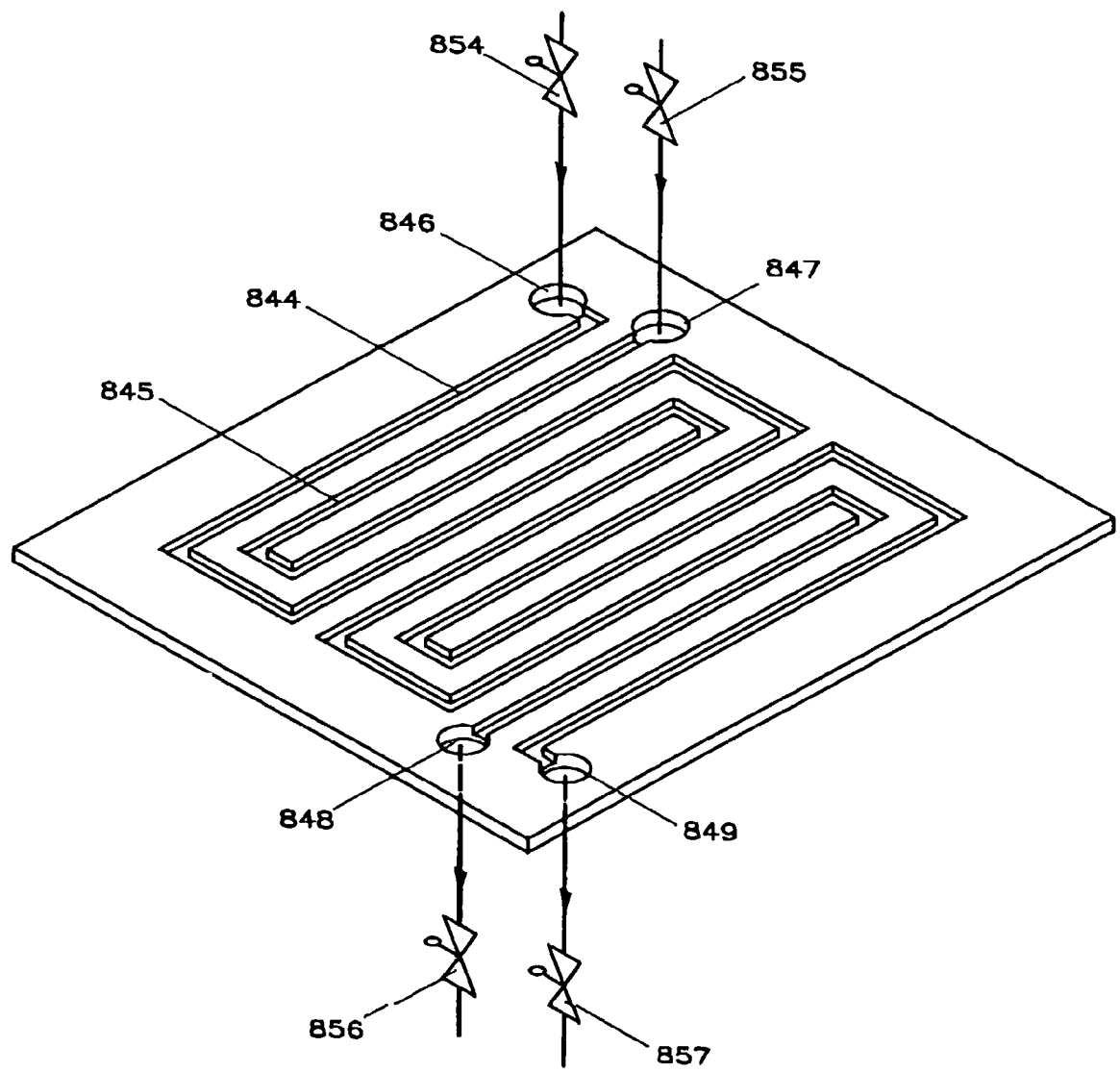

FIG. 8 is an isometric view of a bipolar plate with a flow field arrangement according to another embodiment of the present invention (only two channels are represented for clarity), illustrating individual supply and exhaust passages for each channel, as well as the trajectory of the gaseous reactant before and after the flow field and the valves controlling the operation mode of the flow field.

DETAILED DESCRIPTION OF THE INVENTION

Referring first to FIG. 1, a bipolar plate 11 of a fuel cell with a typical prior art interdigitated flow field generally consists of a plurality of parallel high-pressure channels 16 extending from a supply passage 12 to dead or closed ends 20, alternating between parallel low-pressure channels 17 extending from a dead-end 14 to an exhaust passage 21. The flow field is generally formed in the central portion of the bipolar plate 11 and defines theoretical active area 23 of the cell. On peripheral area 24 surrounding the active area 23 of bipolar plate 11 generally are located supply and exhaust passages 12, 15, 18, 21, 22, 26 of the gaseous reactants and coolant, as well as tie-rod holes 25.

FIG. 2 illustrates the bipolar plate 211 where liquid water 227 has accumulated in time at dead or closed ends 220 of high-pressure channels 216 in the prior art interdigitated flow field during reactant over-humidification, or as a result of vapor condensation. Consequently, effective active area 228 of the cell will be smaller than theoretical active area 23 shown in FIG. 1.

FIG. 3, is an isometric view of a schematic interdigitated flow field of the type illustrated in FIG. 2 but with only one high-pressure channel 316 and two adjacent low-pressure channels 317 represented for clarity. In FIG. 3, there is illustrated the flow path of the gaseous reactant throughout the flow field and the reduced effective active area 328 of the cell caused by liquid water 327 trapped in the high-pressure channel 316. In this case, gaseous reactant 329 coming from the distribution-compression plate (not shown) passes through supply passage 312 and enters high-pressure channels 316 through inlet ports 330. Since at the opposite side from supply passage 312, the high-pressure channels are obturated by dead or closed end walls 320, the reactant will be forced to exit the high-pressure channels along streamlines 331 having a "vertical" component (along the Z axis), and through the gas diffuser (not shown) will enter in the adjacent low-pressure channels 317. After exiting the low-pressure channels through outlet ports 332, the reactant will be directed through exhaust passage 321 towards a fuel cell exhaust 333 (not shown). Since the flow resistance through the porous gas diffuser is many orders of magnitude higher than the flow resistance through the channels 316 and 317, the streamlines 331 in the gas diffuser will follow the shortest possible paths 334, which are lines normal to the symmetry plane of the high-pressure channel 316 and to the symmetry plane of the adjacent low-pressure channels 317, respectively (along the X axis). Consequently, the portion of the gas diffuser situated on the top and between liquid water 327 trapped in the high-pressure channels 330 and the adjacent low-pressure channels 317 will not contain gaseous reactant stream lines 334. Therefore, when liquid water 327 is trapped in the high-pressure channels 316, the effective active area 328 of the cell is reduced to the area of the flow field where the streamlines in the gas diffuser follow paths 334.

Turning now to FIG. 4, there is illustrated a bipolar plate 411 that is substantially identical with the bipolar plate 311 of the FIG. 3. The primary difference is that the flow field according to the present invention has high pressure channels 416 in the bipolar plate 411 provided with individual exhaust passages 435. The individual exhaust passages 435 of each of the high-pressure channels 416 may communicate or not through a connecting channel (not shown) existing in one of the compression-distribution plates (not shown). A normally closed valve 436 obturates the flow passage 435 before communicating with the exterior of the fuel cell stack. When liquid water is accidentally introduced in the high-pressure channels 416, valve 436 may be opened for a short period of time, and the pressure differential between the high-pressure channels and the environment will purge the water out of the channels. Valve 436 can be any valve adapted for use in the system, such as for example only, a solenoid valve, like a Skinner series 7000. Comparing the trajectories 434 of the gas reactant in the present flow field (shown in FIG. 4) with the trajectories 334 of the gas reactant in the prior art interdigitated flow field (shown in FIG. 3), those skilled in the art will notice the advantage of the present invention. That is, the effective active area 428 of the cell according to the present invention is as large as the theoretical active area.

FIG. 5 illustrates a preferred embodiment of the flow field in a bipolar plate 511 of a fuel cell according to the present invention. In order to allow the use of exhaust passages 535 for high-pressure channels 516 with large cross-sectional areas, as well as to insure an adequate spacing for insulation purposes between the high-pressure exhaust passages 535 and the low-pressure side of the flow field (i.e. low-pressure channels 517 and their exhaust passages 521), the channels have to follow radial-circumferential trajectories with the inlets situated at a smaller radius then the outlets. High-pressure exhaust passages 535 and low-pressure exhaust passages 521 with large cross-sectional areas are required for fuel cell systems with a large number of cells and/or when electrical wires are routed from outside of the fuel cell stack, throughout the exhaust passages towards sensors installed inside or in the vicinity of the outlet ports of the channels as discussed herein after. According to the present embodiment of the invention, high-pressure channels 516 extend from a common high-pressure supply passage 512 situated towards the center of the bipolar plate 511, to individual high-pressure exhaust passages 535 situated towards the periphery of the bipolar plate. The high-pressure channels 516 are placed between low-pressure channels 517 extending between dead or closed ends 514 located towards the center of the bipolar plate 511, to individual low-pressure exhaust-passages 521 situated towards the periphery of the bipolar plate. The channels follow a radial-circumferential trajectory, such that exhaust passages 535 and 521 occupy less than 180° of the outer circumference of the bipolar plate 511. Exhaust passages 521A and 535A of the second gaseous reactant occupy the opposite side of the outer circumference. Supply and exhaust passages 515 and 522 for the coolant, are similarly placed towards the periphery or towards the center part of the bipolar plate 511. Tie-rod holes 525 and 539 are placed along the peripheral circumference and in the central part of the bipolar plate 511. Additional passages 540 that provide access from outside the fuel cell stack to sensors located on the bipolar plate 511 may be placed towards the center part of the bipolar plate. It is evident for those skilled in the art that the flow field according to the present embodiment does not have the advantage of the prior art flow field disclosed in U.S. Pat. No. 6,551,736,B1, since each low-pressure channel 517 in the present embodiment is adjacent to a shorter, respectively to a longer high-pressure channel 516. On the other hand, the flow field disclosed in U.S. Pat. No. 6,551,736,B1 does not have the advantage of the flow field according to the present embodiment, as described above.

FIG. 6 shows the placement of a sensor 638, such as a thermocouple, humidity sensor, wire anemometer, etc in the outlet port or exhaust passages of a channel 616 or 617 (compare 516, 517) to measure the physical parameters of the reactant in that channel.

The thermocouple can be any thermocouple adapted for use in the system, such as for example only, a thermocouple like—C01T—produced by Omega Engineering, Inc.

The humidity sensor can be any humidity sensor adapted for use in the system, such as for example only, a humidity sensor, like Hygroclip IM1—produced by Rotronic Instruments Corporation.

The wire anemometer sensor can be any wire anemometer sensor adapted for use in the system, such as for example only, a wire anemometer sensor, like AF210—produced by Topac Inc.

Electrical wires 637 connecting the sensors to controls and indicators outside of the fuel cell stack are routed through exhaust passages 621 and 635 (compare 521 and 535). It is evident that only flow field arrangements with channels having individual exhaust and/or supply passages, as those shown in the present invention may provide capability of monitoring the physical parameters in each individual channel. Such monitoring is important in identifying channel-to-channel or cell-to-cell competitions, as well as for insuring a uniform utilization of the active area of the cells.

As further shown in FIG. 7, a rigid protective cover 741 flush mounted on the face of bipolar plate 711 (compare 611) containing channels 716 and 717 (compare 616 and 617) may be used to protect sensor 738 (compare 638) from interfering with a sealing gasket 742. The figure also shows a gas diffuser 743 situated on the top of the active area of bipolar plate 711, and the sensor 738 being flush mounted to the bottom of the gas channel and wires 737 passing through exhaust passage 735 or 721, from the sensor to the exterior of the fuel cell stack.

FIG. 8 illustrates a flow field arrangement according to another object of the present invention, the flow field being able to operate alternatively as an open-channel flow field, as well as an interdigitated flow field. The novel flow field consists of a plurality of parallel channels 844 and 845 (only two channels are represented for clarity) each channel extending from an individual supply passage 846 or 847, respectively and to an individual exhaust passage 848 or 849, respectively. Control valves 854, 855, 856 and 857 situated upstream of the supply passages 846 and 847, respectively and downstream of the exhaust passages 848 and 849, respectively are used to control the operation mode of the fuel cell. If all the control valves 854, 855, 856 and 857 are open, the gaseous reactant coming from the fuel cell inlet (not shown) will be fed directly in all the channels 844 and 845, respectively through supply passages 846 and 847, respectively and will exit the fuel cell from exhaust passages 848 and 849 through the fuel cell outlet (not shown); in this case the flow field will operate as an open-channel flow field. Alternatively, if for example valves 854 and 857 are open and valves 855 and 856 are closed, the gaseous reactant coming from the fuel cell inlet (not shown) will enter through supply passage 846 only into channel 844 and will be forced throughout the gas diffuser (not shown) into adjacent channel 845, from where will exit through exhaust passage 849 and the fuel cell outlet (not shown) out of the fuel cell; in this case the flow field will operate as an interdigitated flow field with channel 844 as high-pressure channel and channel 845 as low-pressure channel. The flow field will thus take the advantages of the open-channel flow fields operating at low current densities and the advantages of the interdigitated flow fields operating at high current densities. When the flow field operates in interdigitated mode, valve 856 downstream of high-pressure channel 844 may be shortly opened in order to purge the liquid water accidentally trapped in the high-pressure channel.

While particular elements, embodiments and applications of the present inventions have been shown and described, it will be understood, of course, that the invention is not limited thereto, since modifications may be made by those skilled in the art, particularly in light of the foregoing teaching. It is therefore contemplated by the appended claims to cover such modifications as incorporate those features, which come within the spirit and scope of the invention.

What we claim is:

1. A fuel cell system comprising one or more fuel cells, each fuel cell comprising:
   a pair of collector plates, said collector plates containing flow fields including a plurality of channels effective for the flow of reactants;
   a first and a second gas diffuser layer disposed between said collector plates; and
   a membrane electrode assembly including a membrane sandwiched between two electrode layers, said membrane electrode assembly being interposed between said gas diffuser layers;
   wherein at least two of said channels in said flow field are connected to individual exhaust passages that do not communicate with one another and which purge liquid water from said channels and at least some of said channels are connected to a reactant exhaust passage such that any liquid water that exits the individual exhaust passages does not pass through the reactant exhaust passage.

2. The fuel cell system according to claim 1, wherein:
   said flow field comprises alternatively arranged high pressure channels and low pressure channels,
   said high pressure channels extend from a common supply passage to individual exhaust passages for purging liquid water from said high pressure channels; and
   said low pressure channels extending from dead ends to a common reactant exhaust passage.

3. The fuel cell system according to claim 1, wherein:
   said flow field comprises alternatively arranged high pressure channels and low pressure channels;
   said high pressure channels extend from a common supply passage to individual exhaust passages for purging liquid water from said high pressure channels; and
   said low pressure channels extending from dead ends to individual reactant exhaust passages.

4. The flow field according to claim 3, wherein:
   said high-pressure channels follow radial-circumferential trajectories;
   said low pressure channels follow radial-circumferential trajectories;
   said common supply passage of said high pressure channels are situated at a lower radius than said individual exhaust passages of said high pressure channels; and
   said dead ends of said low pressure channels are situated at a lower radius than said individual exhaust passages of said low pressure channels.

5. The fuel cell system according to claim 1, wherein said channels extend from individual supply passages to individual exhaust passages.

6. The fuel cell system according to claim 1, wherein the channels connected to the individual exhaust passages extend along a plane and the individual exhaust passages extend in a direction that is transverse to the plane.

7. The fuel cell system according to claim 1 further comprising a valve for selectively purging the liquid water from the channels.

8. A fuel cell system comprising one or more fuel cells, each fuel cell comprising:
   a pair of collector plates, said collector plates containing flow fields including a plurality of channels effective for the flow of reactants;
   a first and a second gas diffuser layer disposed between said collector plates; and
   a membrane electrode assembly including a membrane sandwiched between two electrode layers, said membrane electrode assembly being interposed between said gas diffuser layers;
   wherein at least two of said channels in said flow field are connected to individual exhaust passages that do not communicate with one another and which purge liquid water from said channels and at least some of said channels are connected to a reactant exhaust passage such that any liquid water that exits the individual exhaust passages does not pass through the reactant exhaust passage,
   wherein at least two channels in said flow field extend along a plane and are connected to said individual exhaust passages which purge liquid water from said channels in a direction transverse to said plane.

9. The fuel cell system according to claim 8, wherein:
   said flow field comprises alternatively arranged high pressure channels and low pressure channels,
   said high pressure channels extend from a common supply passage to individual exhaust passages for purging liquid water from said high pressure channels; and
   said low pressure channels extending from dead ends to a common reactant exhaust passage.

10. The fuel cell system according to claim 8, wherein:
    said flow field comprises alternatively arranged high pressure channels and low pressure channels;
    said high pressure channels extend from a common supply passage to individual exhaust passages for purging liquid water from said high pressure channels; and
    said low pressure channels extending from dead ends to individual reactant exhaust passages.

11. The flow field according to claim 10, wherein:
    said high-pressure channels follow radial-circumferential trajectories;
    said low pressure channels follow radial-circumferential trajectories;
    said common supply passage of said high pressure channels are situated at a lower radius than said individual exhaust passages of said high pressure channels; and said dead ends of said low pressure channels are situated at a lower radius than said individual exhaust passages of said low pressure channels.

12. The fuel cell system according to claim 8, wherein said channels extend from individual supply passages to individual exhaust passages.

13. The fuel cell system according to claim 8, wherein the channels connected to the individual exhaust passages extend along a plane and the individual exhaust passages extend in a direction that is transverse to the plane.

14. The fuel cell system according to claim 8 further comprising a valve for selectively purging the liquid water from the channels.

15. The fuel cell system according to claim 1, wherein each individual exhaust passage defines an opening that extends through the collector plate, wherein the openings are spaced apart from one another.

* * * * *